(12) United States Patent
Phillips et al.

(10) Patent No.: US 10,345,811 B2
(45) Date of Patent: Jul. 9, 2019

(54) METHOD AND APPARATUS FOR SCENARIO GENERATION AND PARAMETRIC SWEEPS FOR THE DEVELOPMENT AND EVALUATION OF AUTONOMOUS DRIVING SYSTEMS

(71) Applicant: GM GLOBAL TECHNOLOGY OPERATIONS LLC, Detroit, MI (US)

(72) Inventors: Matthew E. Phillips, Calabasas, CA (US); Dylan T. Bergstedt, Sherman Oaks, CA (US); Nandan Thor, San Luis Obispo, CA (US); Jaehoon Choe, Agoura Hills, CA (US); Michael J. Daily, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/811,878

(22) Filed: Nov. 14, 2017

(65) Prior Publication Data

US 2019/0146492 A1    May 16, 2019

(51) Int. Cl.
*G05D 1/00* (2006.01)
*G07C 5/08* (2006.01)
*G05B 13/04* (2006.01)

(52) U.S. Cl.
CPC ........ *G05D 1/0088* (2013.01); *G05B 13/041* (2013.01); *G07C 5/085* (2013.01)

(58) Field of Classification Search
USPC .......................................... 701/23
See application file for complete search history.

(56) References Cited

U.S. PATENT DOCUMENTS

| | | | |
|---|---|---|---|
| 9,187,088 B1 * | 11/2015 | Ferguson | B60W 30/09 |
| 10,026,237 B1 * | 7/2018 | Fields | G08G 1/096791 |
| 2017/0124476 A1 * | 5/2017 | Levinson | G05D 1/0088 |
| 2017/0124781 A1 * | 5/2017 | Douillard | B60Q 1/26 |
| 2017/0169208 A1 * | 6/2017 | Jantz | G06F 21/44 |
| 2018/0072313 A1 * | 3/2018 | Stenneth | B60W 30/09 |
| 2018/0154899 A1 * | 6/2018 | Tiwari | G08G 1/0112 |
| 2018/0196439 A1 * | 7/2018 | Levinson | G05D 1/0088 |

* cited by examiner

*Primary Examiner* — Tyler D Paige
(74) *Attorney, Agent, or Firm* — Lorenz & Kopf LLP (57) ABSTRACT

The present application generally relates to methods and apparatus for evaluating driving performance under a plurality of driving scenarios and conditions. More specifically, the application teaches a method and apparatus for testing a driving scenario repetitively while altering a parametric variation, such as fog level, in order to evaluate driving system performance under changing conditions.

17 Claims, 3 Drawing Sheets

METHOD AND APPARATUS FOR SCENARIO GENERATION AND PARAMETRIC SWEEPS FOR THE DEVELOPMENT AND EVALUATION OF AUTONOMOUS DRIVING SYSTEMS

BACKGROUND

The present application generally relates to vehicle control systems and autonomous vehicles. More specifically, the application teaches a method and apparatus for evaluating and quantifying the complexity of events, situations, and scenarios developed within simulation as a measure to assess, and subsequently train, a cognitive model of autonomous driving.

BACKGROUND INFORMATION

In general, an autonomous vehicle is a vehicle that is capable of monitoring external information through vehicle sensors, recognizing a road situation in response to the external information, and manipulation of a vehicle owner. Autonomous vehicle software is tested, evaluated and refined by running the software against various test scenarios to determine the performance of the software and the frequency of success and failure. It is desirable to expose the vehicle software to a variety of potentially challenging situation in order to analyze performance and train new system on a large set of meaningful data, providing enhanced insight into the ability of these systems. It is desirable to perform verification and validation for the system in a simulated environment to ensure that, once deployed, the system will be less likely to fail in certain complex situations. The system may also be used to test the performance of other systems of autonomous control, given that the necessary parameters are simulated correctly within the vehicle, for example, automated braking systems. Therefore, it is desirable to be able to simulate as many possible driving scenarios and conditions as possible in order to identify system weakness and to improve the system in light of those weaknesses.

The above information disclosed in this background section is only for enhancement of understanding of the background of the invention and therefore it may contain information that does not form the prior art that is already known in this country to a person of ordinary skill in the art.

SUMMARY

Embodiments according to the present disclosure provide a number of advantages. For example, embodiments according to the present disclosure may enable testing of autonomous vehicle software, subsystems and the like. This system may further be employed to test other control system software and is not limited to autonomous vehicles.

In accordance with an aspect of the present invention, an apparatus comprising a sensor interface for generating sensor data for coupling to a vehicle control system, a control system interface for receiving control data from the vehicle control system, a memory for storing a first scenario wherein the first scenario is associated with a first parametric variation and a second parametric variation, and a simulator for simulating a first driving environment in response to the first scenario, the first parametric variation and the control data and assigning a first performance metric in response to the simulation of the first driving environment, the simulator further operative to simulate a second driving environment in response to the first scenario, the second parametric variation and the control data and assigning a second performance metric in response to the simulation of the second driving environment.

In accordance with another aspect of the present invention, a method comprising receiving a driving scenario, a first parametric variation and a second parametric variation, simulating the driving scenario using the first parametric variation, evaluating a first driver performance in response to the driving scenario, the first parametric variation and a first control data, assigning a first performance metric in response to the first driver performance, simulating the driving scenario using the second parametric variation, evaluating a second driver performance in response to the driving scenario, the second parametric variation and a second control data, and assigning a second performance metric in response to the second driver performance.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. For example, the algorithms, software and systems of the present invention have particular application for use on a vehicle. However, as will be appreciated by those skilled in the art, the invention may have other applications.

Driving complexity is typically measured in relation to specific scenarios along with the rules of the road and goals of driving. For example, in a left turn scenario, the timing of the decision to execute the left turn at a T-junction is a critical moment with numerous contributing complexity factors which ultimately contribute to the resultant behaviors and outcomes. In another exemplary scenario, a driver or pedestrian in or near a stopped vehicle may wave traffic by if the car is blocking a portion of the road. Successful navigation of the stopped car and oncoming traffic requires the driver to observes, assess, and judge the complex factors and potential dangers based on other drivers' behavior while negotiating this complex situation.

In determining and quantifying driving complexity it is desirable to emphasize the development, parametric variations, and quantification of scenarios where current AI or deep-learning based autonomous driving systems have the poorest performance. Complexity can also be quantified theoretically and measured in a variety of ways. For example, certain behavioral measures allow researchers to quantify driving performance, such as vehicle distance to center of the lane, or following distance to other traffic. In addition, a human's performance on a driving task can be assessed with behavioral and neurophysiological metrics of engagement, performance, and factors contributing to lower performance. The behavioral measures include reaction time for decisions and behaviors including perceptual detection, discrimination, and time on task.

Typical driving failures result from human error and procedural failures. Neural measures using electroencephalograms and other non-invasive brain imaging techniques include cognitive workload, engagement and the cognitive state of the operator, such as fatigue, spatial attention etc., in the subtask processes. The driving control inputs can also be used to assess the performance given a target or ideal condition, decision, or path (e.g. motor tracking errors). The driver's prior experience and access to the experience and knowledge are also critical factors in decision making performance. The decision processes for drivers in highly complex situations are a specific emphasis for the design of the scenarios and the complexity and grading metrics of both human in loop (HIL) and autonomous driving examples from these scenarios. The goal is to initially train the cognitive model using the "best" HIL examples of the complex scenarios, and then to generate good and bad training data using an autonomous control system and grading the subsequent exemplars on a cluster.

In research concerning HIL driver behavior and traffic safety, complexity measures are often derived to quantify the difficulty of traffic situations and assess performance. This depends on a number of environmental factors, and metrics such as traffic density, driver agent behavior, occupancy and mean speed ground truths as generated by traffic control cameras, and overall configuration of traffic, roads, and percept qualia. In order to train the cognitive driving system, all of these variables must be manipulated in automated fashion in order to create a rich library of scenarios from which to generate accurate semantic information and generate novel behaviors that meet or exceed the capability of human drivers. The current system utilizes a sweep of these parameters to produce scenarios of varying complexity and provide rapid iterations and variations to scenarios that would be infeasible to replicate in real-world driving contexts.

Within a scenario, an 'episode' is defined as a discrete set of 'events' and is the top-level hierarchy of the cognitive system. The episode can be considered the basic unit of memory within the cognitive system that define sequences of continuous phenomena that describe an instance of some vehicular scenario, e.g. a left turn at a busy intersection. A complete episode is comprised of smaller sequences called 'events,' which are specific, stereotyped occurrences that may be shared across multiple episodes. In the example above, some events comprising the episode can include items such as the velocity of cross traffic, available gaps within the traffic, trajectory of other vehicles/pedestrians, or the current lane position of the self-vehicle. Such discretized phenomena are not necessarily unique to the circumstances of the left turn event, and could be present in other episodes; for example, pedestrians may be present in an episode describing a parking scenario.

Each event is defined by percepts, or observations taken from the environment by data provided by internal and external sensor systems. These percepts are collected as 'tokens' and consist of a package of data streamed from sensor systems in real time. These data are then processed and used to define events. Percepts include critical information about the world, such as lane positions, turn lanes, and other environmental conditions integral to the act of driving. Also integral are properties of agents within that world, such as object definition, allocentric velocity, heading, etc., and aspects of the self-vehicle, such as egocentric velocity, heading, etc. Tokens are streaming percepts that are assembled to define discrete units of scenario states, called events. Then, a collection of observed events are learned through real-world driving and simulation to generate end-to-end scenarios called episodes, which are stored as the major units of memory.

It is desirable to learn as many episodes as possible which is more feasible through passive collection through real-world driving scenarios because the nature of the cognitive processor demands relevant, practical experience in order to more thoroughly learn and subsequently improve driving performance. In contrast to deterministic rule-based systems, cognitive processors must be exposed to as much real-world data as possible, including subtle variations of a given scenario that it may be required to evaluate in a deployed environment. Unfortunately, in situ exposure to develop a cognitive model in a physical vehicle is resource-intensive, time-consuming, and inconsistent; that is, desired variations to a scenario must be encountered by chance through unknown iterations of human-assisted driving, and/or painstakingly replicated in the physical world in a closed-circuit. As a result, scenarios within realistic simulation have been produced that allow rapid iteration of various world states, such as road lane configuration, traffic scenarios, self-vehicle properties, and non-self agent behaviors for faster-than-real time storage of episodes. This allows for a much richer episodic memory bank, and provides a more extensive library of scenarios from which the cognitive system can undergo machine learning and generate semantic relationships, critical for generative, non-rule-based agency.

During simulation tokens may be generated in real-time via streaming of percepts through an interface. Vehicular and environmental data are collected per simulation step and streamed to an output socket for collection into the cognitive model, which then packages collected token data into events. Percepts may be collected from vehicle 'self port' data, and be tokenized on a per-vehicle basis, providing an allo-centric position/velocity array of every agent within the scenario. Environmental states, such as road configurations, are reconstructed in the cognitive model through data collected from lane marker sensors which define the edges of valid lanes and provides information about intersections or thoroughfare configurations that are learned as components of episodes by the cognitive system. Non ground truth devices may be tokenized on a per-device basis. The 'sensor-world' will then take the place of ground-truth self-port data, and be subject to realistic perturbations of the percept stream, such as sensor occlusion, malfunction, or signal attenuation due to environmental factors such as rain or fog. Delineation of individual events and episodes will at first be facilitated by the production of scenarios in simulation. With the rapid collection and automation of varying events through parameter sweeps of simulation variables (e.g. lane number), the cognitive system will eventually define the temporal edges of events through utilization of grammar algorithms and hierarchical clustering techniques.

Figure 1:
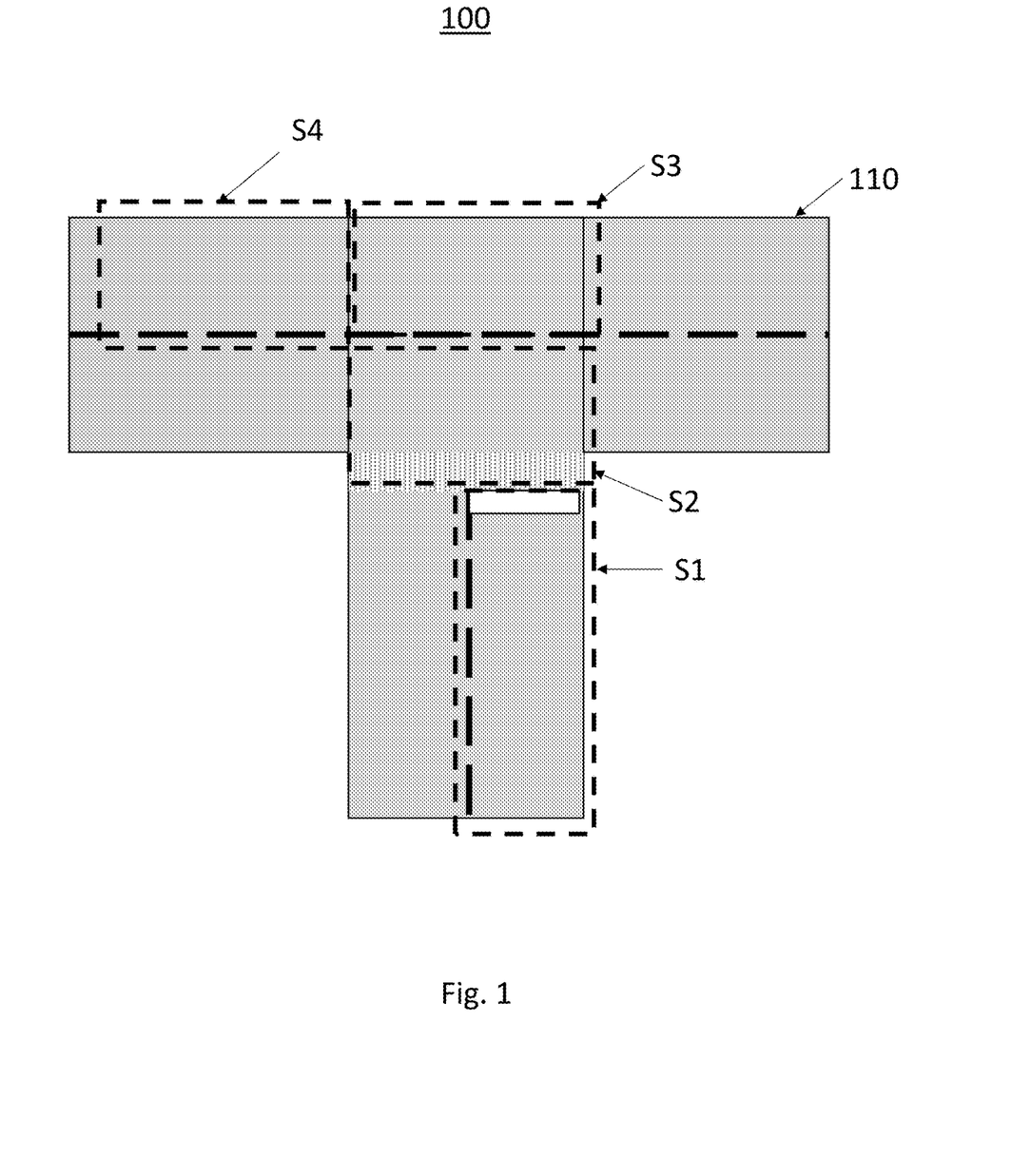
FIG. 1 is an exemplary left turn scenario according to an embodiment.

Turning now to FIG. 1, an exemplary left turn scenario is shown. In order to generate an accurate and meaningful complexity metric, the scenario is divided into subtasks. The T junction road surface 110 is shown where a vehicle approaches from the lower road S1 and navigates a left turn across one lane of traffic. The introduction of a complexity metric allows a complexity value to be computed at the subtask level during an autonomous driving task. By taking data that is generated during simulation and extracting a measure of complexity, the autonomous vehicle creates a basis for scenario comparison and a basis for taking action based on previous situations with similar complexity scores. Attentional demand of the autonomous system can then be based on complexity. The complexity measure ultimately feeds in to the cognitive model, along with grading scores, to guide decision making. In this exemplary embodiment, the evaluation is performed on a left hand turn scenario. Within this scenario there are many iterations that can occur based on, for example, traffic density, number of pedestrians, weather conditions, etc. In order to measure complexity, the main task of making a left-hand turn is broken down into subtasks. In this exemplary embodiment, the main task of making a left turn is broken up into four subtasks S1, S2, S3 and S4. In order to allow for scalability to other scenarios, features of the subtasks are found to build a set of guidelines to break the data into subtasks. Subtask 1's S1 endpoint is determined by finding the time point where the car's velocity drops below a certain acceptable stopping speed. Subtask 2's S2 endpoint is then found when the car exceeds a certain acceleration velocity. Subtask 3's S3 endpoint is located by identifying when the x-coordinate of the car stops changing. It is assumed that the endpoint of one subtask is the beginning point of the next subtask. These features that determine the end of respective subtasks should be scalable to most simple left-turn scenarios but it will depend on the aggressiveness of the driver, familiarity with the road, and simplicity of the left turn task.

The purpose of breaking the left-turn task into subtasks is because complexity changes based on where in the task complexity is measured. By splitting the task into subtasks, it is possible to see how complexity changes among different parts in the task but also how complexity changes over time. By chunking the task into subtasks, complexity can be calculated within each subtask and complexity can be calculated among subtasks as a function of time. Inherently, complexity changes from subtask 1 S1 to subtask 2 S2 demonstrate a difference in complexity over time. However, within a subtask, features are generally the same, so measuring differences among subtasks gives a non-trivial temporal difference in complexity. Generally, subtasks are determined based on difference of features, which allows for a natural temporal complexity comparison between subtasks. Certainly, there may be some features that change within a subtask but fundamental to how subtasks are broken down is a minimization of those feature changes. Depending on the application, it may be of interest to measure how complexity changes temporally throughout the entire task or exclusively in one subtask. Since subtasks are continuous (the endpoint of one is the starting point of the next), both large-scale (throughout a task) and small-scale (throughout a subtask) temporal complexity can be calculated and we postulate that our future efforts will extrapolate these complexity measures to a continuous or discrete event-related time domain.

Specific features calculated from the data from the simulations are used to map to the complexity parameters. For example, the weather can play a very important role in determining perceptual complexity and to a lesser degree, the speed of decision making. A direct way to measure the number of alternatives, and therefore estimate the complexity, is to measure the mean number of lanes in each subtask. Counting the number of lanes may be a direct measure of complexity in this left turn scenario as it indicates approaching an intersection, where there are a large number of alternatives. However, the number of lanes may not be as indicative of complexity in other situations such as a multi-lane highway may have four lanes in each direction but it may not be as complex as even a two way intersection. The number of lanes may only be important at lower speeds, which means that the interaction between the speed feature and the number of lanes feature may need to be considered in the future. The fundamental idea behind using the number of lanes in this scenario is that it (1) indicates an intersection in this scenario and (2) indicates a choice of lanes to merge into. In this way, counting the number of lanes can be used to compute complexity. Another measure of the number of alternatives can be taken in a temporal dimension, as opposed to a spatial dimension. In that regard, the number of gaps in traffic can be used to determine alternatives. The idea behind measuring the amount of gaps in traffic in a given subtask is that it allows for a measure of how many opportunities to make the left turn were presented. This information may be used in conjunction with the number of lanes data in order to give a more complete measure of alternatives. However, with an eye towards scalability, the number of alternatives may not always scale with the gaps in traffic in any scenario where driving across traffic is not necessary. In that case, another temporal alternatives feature must be found. It is important to measure the number of alternatives both spatially and temporally regardless of the driving situation.

Fundamentally, criticality is a subjective measurement and can be thought of as the expected value of the risk of not making a decision. That is, if risk is high in one subtask relative to the other subtasks, such as when going through an intersection, criticality is high in that subtask. In the specific case of the left turn, criticality is high when approaching the stop sign and when making the left turn. In this case, criticality is high when velocity is low, such as stopping at a stop sign and starting a turn. In that regard, criticality can be measured as the inverse of the velocity, in this specific scenario. However, criticality is the most scenario-specific complexity measure and in the case of highway driving, criticality may increase as speed increases or it may increase when slowing down to exit the highway. Thus, criticality will be very different in each situation and even within situations in each subtask.

A direct measure of perceptual complexity is weather. Perceptual complexity increases drastically in heavy snow or heavy fog conditions. Another measure of perceptual complexity is the number of objects that the sensors pick up. The idea behind measuring the number of objects seen by the car in a given subtask is that the more objects that the car has to interact with, the more complex the perception by that car has to be. This feature should be relatively scalable, although the weight may change based on the scenario. For example, the number of objects may be more important than the weather when crossing a busy intersection on a clear day but the number of objects may be less important when driving on a winding desolate road in snowy conditions.

Finally, the speed of the decision can be seen as the inverse of the total length of the subtask. The larger the amount of time that the driver is in a certain subtask, the longer the speed of the decision. This is tied to the velocity of the driver as well, with the larger the velocity, the lower the speed of the decision as the driver spends less time in the specific subtask. In terms of the complexity calculation for speed of decision, the amount of seconds in each subtask is calculated. Inherent in this calculation is velocity, so it is not explicitly factored into the speed of the decision. This feature is scalable: the speed of the decision is fundamentally found by taking the inverse of the length of the subtask the longer the subtask, the slower the speed of decision, given that subtasks are partitioned correctly.

The next step is to compare the calculated complexity scores with the subjective complexity scores created by a human. Complexity scores created by humans include error rate probabilities and familiarity, which are not accounted for in the calculated complexity scores. It is desirable to initially match the calculated complexity scores with the human created complexity scores in order to establish a baseline. So in order to match the calculated and created complexity scores the different subtask complexities are weighted and adjusted in order to better match the human scores. This process of comparing the algorithm-computed complexity scores to subjective human complexity scores will continue to occur as data is generated, with the process iterating back on itself to continue to fine tune the algorithm. Many human created complexity scores are aggregated and normalized in order to generalize the algorithm.

In order to determine correlation among subtasks or complexity categories and human complexity scores, the data is analyzed from a different perspective. Within a given scenario, the total complexity among complexity categories for subtask 1 is calculated. In an exemplary embodiment, the total complexity value is then divided by the total algorithm complexity score among all of the subtasks and then multiplied by 100. This gives a scaled feature that shows how much subtask 1 contributes to overall complexity for scenario 1. After the scaled complexity contributions for each subtask are calculated, the scores are further scaled within each subtask. That is, all of the subtask scores are then divided by the highest score of any subtask among all scenarios, to scale the results within the given subtask. The calculated complexity results are then compared to the human complexity scores. Similarly to the subtask scores, all of the human complexity scores are divided by the largest human complexity score among the subtasks, which allows for comparison by similar scaling.

Subtasks with a negative correlation with human complexity scores, such as approaching the stop sign and slowing down, are expected to be simple subtasks which do not greatly contribute to the overall complexity. So, it is expected that as the amount of complexity of a subtask contributes to overall complexity, it is a more complex subtask. For example, if slowing down when approaching a stop sign 1, which is the simplest subtask in making a left turn, contributes a lot to the overall complexity, the task itself was not very difficult relative to other tasks.

The same analysis is repeated among all complexity categories. Each complexity category's total score is found among all subtasks in a given scenario. This score is then divided by the total complexity score for the scenario and then multiplied by 100. This calculation computes the relative percentage that the complexity category contributes to the total complexity in a given scenario. This calculation is repeated for every complexity category.

Using distributed simulation, the complexity measure of a traffic scenario can be automated and iterated rapidly to maximize the amount of scenario data available to the cognitive system. Parameters within simulation, such as traffic density, can be manipulated as needed, and parameter sweeping can be utilized to rapidly generate traffic scenarios in a wide range of complexity scores. Many thousands of variations of complexity scenarios can then be run simultaneously on distributed cluster hardware to populate the episodic memory of the cognitive learning model to expose it to a rich array of episodes that will guide driving behavior.

Returning to the exemplary embodiment, four stages of a left turn scenario in which complexity measures change as the self-vehicle proceeds during the turn. In the S1 phase, the car is stationary and actions are limited to go/no go. In this stage, the criticality and perceptual difficulty of the task may be altered through addition or subtraction of simulation assets such as pedestrians or parked cars that represent critical elements the prevent action, or visual obstruction/obfuscation that creates additional complexity in proceeding to S2. These elements can be scripted in order to automatically generate many situational instances that greatly diversify the conditions of S1. Similarly, the complexity Of S2 can be modified by altering the speed of cross traffic, density of traffic, or type of traffic, such as truck vehicle types that limit visual range, in automated fashion. S3 can be modified by the same, but also contain automation that adjusts the aggressiveness of cross traffic or the consistency of cross traffic. Finally, the complexity Of S4 may be modified by such factors as sudden braking, road type, merging behaviors of non-self-vehicles and the presence of "surprise" obstructions, such as road debris, lane visibility, etc. Parameters that affect global decision-making, such as the presence of additional lanes, special lanes, construction, or other likely road-going scenarios are all additional elements that is suitable for automation. Other parameters difficult or dangerous to replicate in road-going conditions, such as sensor occlusion or failures, can also be modulated to various degrees safely within simulation. Through modification of these experimental variables, there is the potential to generate thousands of permutations of a given traffic episode that will provide rich training data for the cognitive system. This rapid iteration of traffic variables, and the parallelized, cluster-based simulation of both self- and non-self vehicle actions is the key to furnishing the cognitive model with extensive training data beyond what is feasible through real-world driving alone. The benefits of this approach are complete parametric control over environmental and vehicle situations and traffic behavior. This facilitates the testing of edge cases safely while systematically modifying the model parameters to ensure that the cognitive architecture performs at and beyond the capabilities of the best human drivers.

Figure 2:
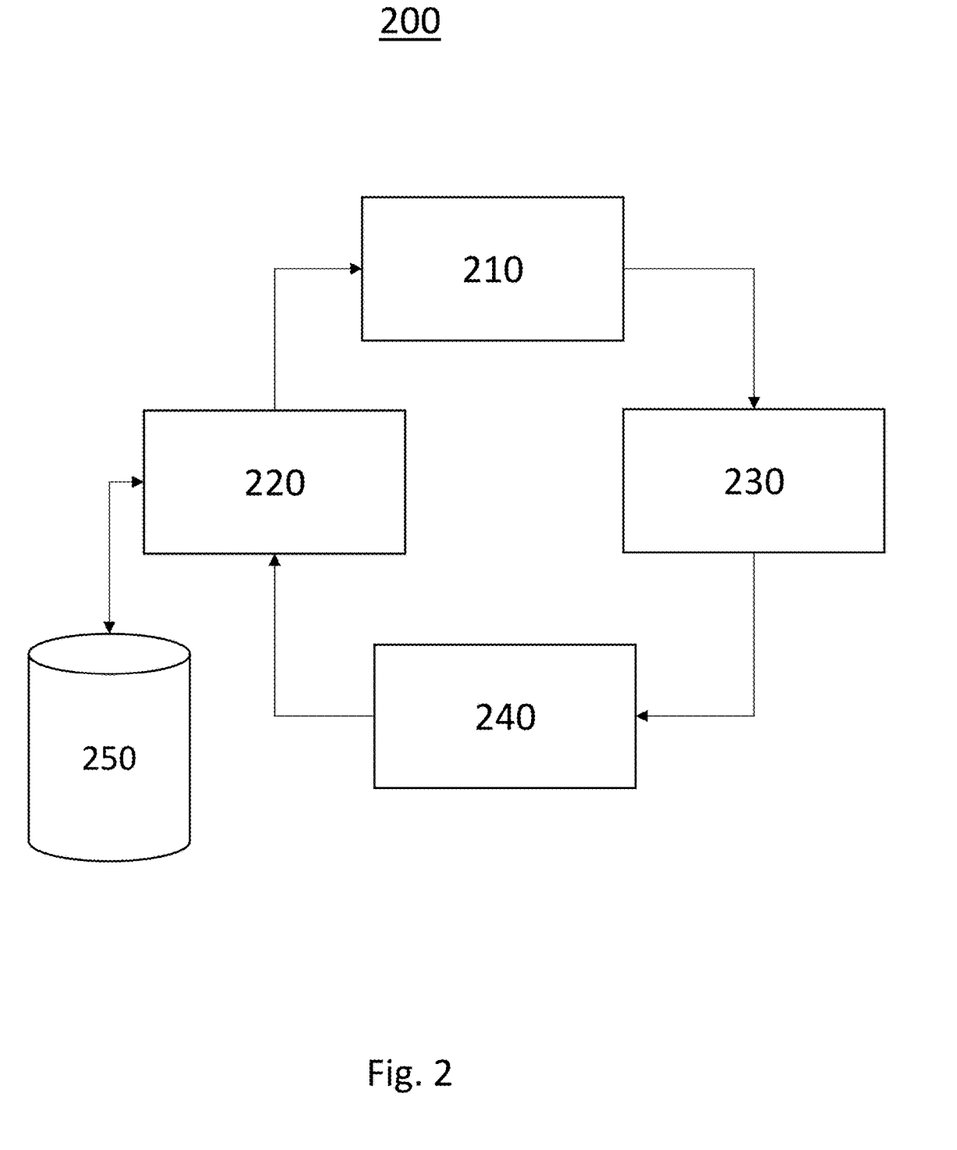
FIG. 2 is an exemplary apparatus for implementing the method for autonomous system performance metric generation and benchmarking according to an embodiment.

Turning now to FIG. 2, an exemplary apparatus 200 for implementing the method for autonomous system performance metric generation and benchmarking is shown. The apparatus 200 is operative to simulate a driving scenario for evaluation and quantifying the performance of a driving system, including an autonomous driving system. The apparatus is used to quantify the cognitive cost and effort required by a driver, or driving system, to successfully complete the scenario. The apparatus comprises a simulator 220, a sensor interface 210, a vehicle control system 230, a control system interface 240, and a memory 250. The sensor interface 210 and the control system interface 240 are operative to interact with the vehicle control system. The apparatus may be implemented in hardware, software or a combination of both.

The simulator 220 is operative to simulate the driving environment and scenario and generate control signals for controlling the sensor interface 210. The sensor interface 210 is operative to generate sensor signals that are readable by the vehicle control system 230. The sensor signals interface with a way with the vehicle control system 230 such that it appears to the vehicle control system that it is operating in the actual environment. The control system interface 240 receives control signals generated by the vehicle control system 230. The control system interface 240 translates these control signals into data used by the simulator 220 as feedback from the scenario. The scenarios are stored on the memory 250 which is accessed by the simulator. The simulator is further operative to store additional information and updates to the scenarios and complexity metrics on the memory 250.

Figure 3:
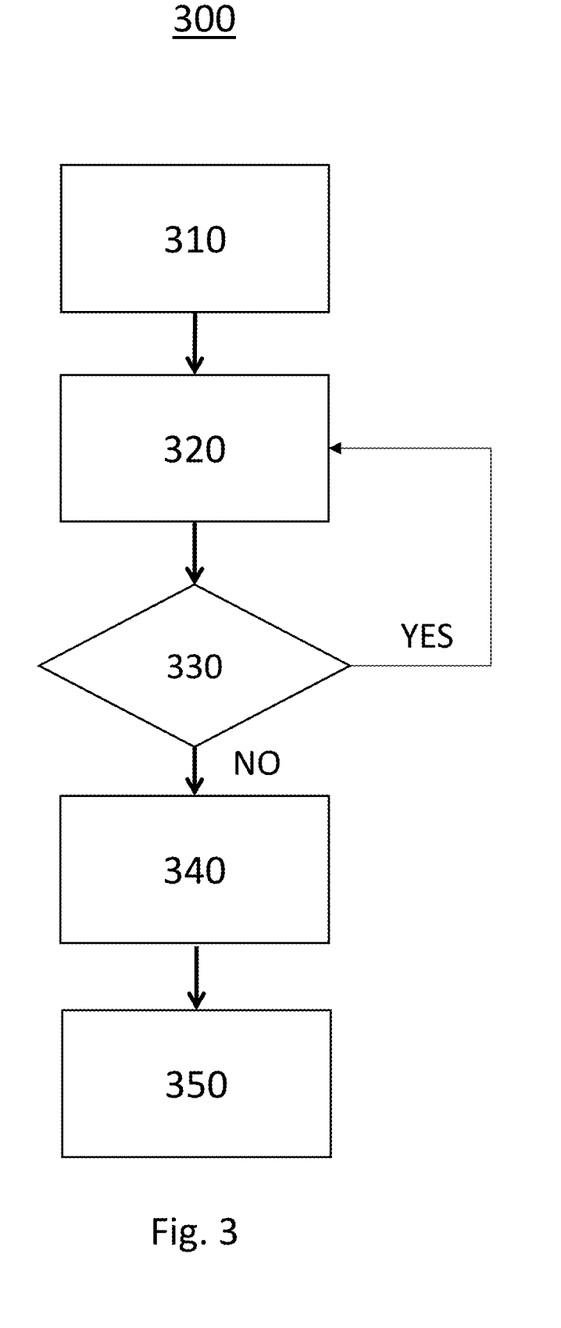
FIG. 3 is an exemplary method for scenario generation and parametric sweeps for the development & evaluation of autonomous driving systems according to an embodiment.

Turning now to FIG. 3, an exemplary method for scenario generation and parametric sweeps for the development & evaluation of autonomous driving systems 300 is shown. The proposed method and corresponding system is distinct from other simulation examples because of its ability to be applied to a multitude of potentially complex driving scenarios with realistic actor behavior. Previously simulation has been focused on testing one specific feature of an autonomous vehicle. The exemplary parameter sweep, focusing focus on situations that have proven challenging for autonomous vehicles in the past, allows for a higher degree of confidence in regards to the real world readiness of systems that perform well across driving scenarios under all conditions of the parameter sweeps. By creating an in depth parameter sweep technique that involves both actor behavior as well as physical characteristics across a diverse set of potentially complex scenarios the system is operative to compare the performance of several autonomous systems and features. The system is further operative to generate many variations of highly complex, potentially dangerous examples that may be prohibitive for real world testing, or that a human assisted prototype AI may not encounter for millions of miles. By focusing on these complex situations and automating parameter sweeps involving the difficult situations the system is able to quickly scale up the acquisition of relevant useful data in much greater quantities.

The method is first operative to receive a driving scenario 310. The scenario may be received in response to a control signal generated by the simulator or may be received from a separate controller source. The scenario will have at least one set of parametric variations associated with the scenario. This exemplary method facilitates the rapid generation of meaningful data while not utilizing resources on scenarios that are easily handled by the autonomous control system. The result is faster training with a reduced the amount of real world failures in rare situations. The method and system enable system developers to test many features of their autonomous vehicle system across a wide range of conditions.

The method is then operative to utilize the first of the parametric variation and to simulate the driving environment 320. The current system and method utilizes a set of parametric variations in order to train an autonomous cognitive system and, to gauge the performance of said system in a simulated environment. The system is operative to create a highly complex, diverse set of scenarios that may be encountered while driving. Specific parameters are then swept in simulation including: weather (rain, fog, and snow), traffic velocity, aggressiveness of traffic, presence of pedestrians/cyclists, reactiveness of other actors in the scene, sensor health/percept quality, and the lane keeping ability of each agent. The parameter sweeps are run across a variety of potentially challenging situations that have previously proven challenging for autonomous vehicles, for example, a left turn at busy intersection. By running parameter sweeps across the scenarios, a large amount of meaningful data regarding the behavior of other traffic and autonomous agents in high complexity scenarios, along with the capabilities of the system being tested can be acquired. These sweeps also allow the system to pinpoint specific weaknesses of any control system by recording the parameters and scenarios where the system does not perform optimally. The system allows autonomous systems to be vetted for real world use or testing. It would take a great deal of real world driving time to witness many of the complex situation that are covered in the parameter sweeps resulting in a long delay and uncertainty about the abilities of the system in highly complex situations. Scenario set and parameter sweeps can greatly reduce the cost and time, associated with training a new autonomous vehicle feature. The feature can be validated and we can guarantee that the system will perform in real world testing. The quality and amount of useful data also has the potential to be greatly increased due to the thorough generation of training traffic conditions.

In order to fully account for different experimental conditions, it is desirable to perform parameter sweeps in order to create scenarios that provide a plethora of resulting data. Several variables are manipulated in order to mimic realistic driving conditions ranging from simple to complex. The definition of complexity may be defined by dividing complexity into five subcategories. Complexity categories may include, but are not limited to, criticality, alternatives, perceptual complexity, decision speed, and surprise. By mapping outputs from the simulator to these five complexity categories, an accurate measure of complexity can be computed per scenario variation. In this exemplary embodiment the left turn task is broken down into four distinct subtasks. The first subtask is approaching the stop sign, the second subtask is stopping at the stop sign, the third subtask is making the left turn, and the fourth subtask is completing the turn and matching surrounding traffic speed. Each subtask is assigned an individual complexity grade for each complexity category. The data acquired can be used to: quantify the complexity of the scenario, evaluate the performance of a system, or teach a system about traffic behavior and realistic scenarios. This and other scenarios are simulated as each scenario presents unique challenges that can be quantified by a complexity metric. These scenarios include rare and challenging situations that result in generally high complexity scores and that are uncommonly encountered during driver testing. Variables are then swept for each scenario.

Velocity can be swept by defining the recommended speed for each scenario. From this realistic deviation from this speed can be incorporated into the traffic cars in the scenario. This can be done by setting the desired speed of the traffic car equal to the recommended speed of the scenario +− a random number. The trajectory of each actor within the scenario can also manipulated to show several possible paths an actor may choose in a real driving situation. For example, an agent leaving a parking lot may have the option to turn left, turn right, or go straight at the intersection. The paths can be manipulated manually or an automated script can be utilized to randomly select a trajectory. Pedestrian and cyclist velocities and trajectories can also be manipulated in a similar fashion. The average preferred walking speed for adult males and females has been experimentally determined to be 1.2 m/s to 1.4 m/s (≈3 mph). The speed of pedestrians in testing may be swept from 1 to 3 m/s in order to show a large range of walking speeds. Likewise, average cycling speed is approximately 4.5 m/s (≈10 mph). Simulated bikes in the scenario may be assigned velocities ranging from 4.5 m/s to 8.5 m/s for example, to display leisurely and fast cycling paces.

The parameter of weather may also swept. Precipitation and visibility due to fog are manipulated in order to reproduce realistic weather conditions. The National Weather Service issues a fog advisory when visibility falls below ¼ mile (≈402 meters). Visibility due to fog may be set from 402 meters down to 50 meters in order to demonstrate a wide range of possible fog conditions. The severity of rain is altered by changing the density of rain drops per meter cubed (184-384) and altering the diameter of each drop (0.77 mm-2.03 mm [5]). Simulated models may employ real world physics where larger drops fall more quickly. The snowflake diameter is changed between trials (2.5 mm-20 mm), with larger flakes indicating heavier snowfall. Speed and density of the snowflakes may remain constant or change with atmospheric conditions. At high densities of rain, fog and snow the situation becomes very complex. The following distance and aggressiveness of other agents in the scenario is also manipulated. Less complex examples contain fewer pedestrians. More complex trials contain pedestrians that would cross unexpectedly, for example, pedestrians traversing outside of crosswalks or the presence of a condition/object that occludes humans or other critical entities from the sensors of the autonomous vehicle. Less complex examples contain only cyclists in designated bike lanes. More complex examples contain cyclists in lanes of traffic shared with vehicles. The acceptable following distance is manipulated for vehicles, in more complex examples shorter distances are used to lessen the gaps accessible for the autonomous vehicle during the turn. Some traffic vehicles are given the ability to switch lanes in order to pass a slow vehicle in more complex trials. Another important parameter to be swept is actor density. The number of actors present in each trial is also altered. Initially fewer actors may be present and additional actors may be added to the experiment in order to increase complexity.

The method is then operative to evaluate the performance of the driving system in response to the scenario with the parametric variation 330. The method is then operative to check to see if there is an additional parametric variation to simulate 330. If yes, the method is then operative to utilize the next parametric variation and to simulate the driving environment 320. If not, the method may then be operative to assign a performance metric to each of the tested parametric variations and, optionally, an overall performance metric 340. The method may then be able to assign a complexity metric to each parametric variation within the scenario and, optionally, an overall complexity 350. Again, the driver may be a human driver, a partial assist autonomous driving system or a fully autonomous driving system.

What is claimed is:

1. An apparatus comprising:
   a sensor interface for generating sensor data for coupling to a vehicle control system;
   a control system interface for receiving control data from the vehicle control system;
   a memory for storing a first scenario wherein the first scenario is associated with a first parametric variation and a second parametric variation; and
   a simulator for simulating a first driving environment in response to the first scenario, the first parametric variation and the control data and assigning a first performance metric in response to the simulation of the first driving environment, the simulator further operative to simulate a second driving environment in response to the first scenario, the second parametric variation and the control data and assigning a second performance metric in response to the simulation of the second driving environment.

2. The apparatus of claim 1 wherein the first parametric variation and the second parametric variation relate to intensity of weather.

3. The apparatus of claim 1 wherein the memory is operative to store a second scenario associated with the first parametric variation and the second parametric variation.

4. The apparatus of claim 1 wherein the apparatus is implemented in software.

5. The apparatus of claim 1 wherein the apparatus is implemented in hardware.

6. The apparatus of claim 1 wherein the simulator is further operative to generate a success rate in response to the first performance metric and the second performance metric.

7. The apparatus of claim 1 wherein the vehicle control system is an autonomous vehicle control system.

8. A method comprising:
   receiving a driving scenario, a first parametric variation and a second parametric variation;
   simulating the driving scenario using the first parametric variation;
   evaluating a first driver performance in response to the driving scenario, the first parametric variation and a first control data;
   assigning a first performance metric in response to the first driver performance;
   simulating the driving scenario using the second parametric variation;
   evaluating a second driver performance in response to the driving scenario, the second parametric variation and a second control data; and
   assigning a second performance metric in response to the second driver performance.

9. The method of claim 8 further comprising assigning an overall performance metric in response to the first performance metric and the second performance metric.

10. The method of claim 8 wherein the first parametric variation and the second parametric variation relate to intensity of weather.

11. The method of claim 8 wherein the first parametric variation and the second parametric variation relate to a velocity of a vehicle within the driving scenario.

12. The method of claim 8 wherein the first parametric variation and the second parametric variation relate to a number of vehicles within the driving scenario.

13. The method of claim 8 wherein the first parametric variation and the second parametric variation relate to velocity of a pedestrian within the driving scenario.

14. The method of claim 8 wherein the first parametric variation and the second parametric variation relate to a visibility within the driving scenario.

15. The method of claim 8 wherein further comprising receiving a third parametric variation, simulating the driving scenario using the third parametric variation and assigning a third performance metric in response to a third driver performance.

16. The method of claim 15 further comprising assigning an overall performance metric in response to the first performance metric, the second performance metric and the third performance metric.

17. The method of claim 8 wherein the first parametric variation and the second parametric variation relate to sensor performance within the driving scenario.

\* \* \* \* \*